United States Patent [19]
Beck et al.

[11] Patent Number: 5,441,775
[45] Date of Patent: Aug. 15, 1995

[54] RADIATION-CURABLE, AQUEOUS DISPERSION

[75] Inventors: Erich Beck, Schriesheim; Gregor Ley, Wattenheim; Erich Gulbins, Heidelberg; Bernhard Schlarb; Edmund Keil, both of Ludwigshafen; Matthias Lokai, Enkenbach-Alsenborn, all of Germany

[73] Assignee: BASF Aktiengesellschaft, Ludwigshafen, Germany

[21] Appl. No.: 238,880

[22] Filed: May 6, 1994

[30] Foreign Application Priority Data

May 12, 1993 [DE] Germany ............ 43 15 831.5

[51] Int. Cl.$^6$ .............................. B05D 3/06
[52] U.S. Cl. .......................... 427/496; 427/507; 427/508; 427/520; 427/386; 428/461; 523/410
[58] Field of Search ............ 523/410; 427/386, 496, 427/507, 508, 520; 428/461

[56] References Cited

U.S. PATENT DOCUMENTS

| | | | |
|---|---|---|---|
| 3,380,831 | 4/1968 | Cohen et al. | 522/121 |
| 3,914,165 | 10/1975 | Gaske | 204/159.15 |
| 5,045,435 | 9/1991 | Adams et al. | 430/288 |

FOREIGN PATENT DOCUMENTS

| | | |
|---|---|---|
| 321618 | 6/1989 | European Pat. Off. |
| 486278A1 | 5/1992 | European Pat. Off. |
| 486278 | 5/1992 | European Pat. Off. |

OTHER PUBLICATIONS

G. Odian, "Principles of Polymerization", 1981, p. 31.

Primary Examiner—Melvyn I. Marquis
Assistant Examiner—D. Aylward
Attorney, Agent, or Firm—Keil & Weinkauf

[57] ABSTRACT

Aqueous dispersions contain
A) from 20 to 90% by weight of a dispersed polymer having a glass transition temperature above 30° C. and
B) from 10 to 80% by weight of a tri-, tetra-, penta-or hexa(meth)acrylate of an alkoxylated, trivalent to hexavalent alcohol having a mean degree of alkoxylation of the hydroxyl groups of the alcohol, defined as the quotient of the number of alkoxy groups to the number of hydroxyl groups, ie. the functionality of the alcohol prior to the alkoxylation, of at least 0.5, the stated weights being based on the sum of A) and B).

7 Claims, No Drawings

RADIATION-CURABLE, AQUEOUS DISPERSION

The present invention relates to aqueous dispersions containing

A) from 20 to 90% by weight of a dispersed polymer having a glass transition temperature above 30° C. and B) from 10 to 80% by weight of a tri-, tetra-, penta-or hexa(meth)acrylate of an alkoxylated, trivalent to hexavalent alcohol having a degree of alkoxylation of the hydroxyl groups of the alcohol, defined as the quotient of the number of alkoxy groups to the number of hydroxyl groups, ie. the functionality of the alcohol prior to the alkoxylation, of at least 0.5, the stated weights being based on the sum of A) and B).

The present invention furthermore relates to the use of the dispersion as a coating material.

In order to avoid solvent waste, aqueous systems are increasingly being used also in the case of radiation curing. Such aqueous systems are suitable for the production of coatings, for example including open-pore, matt wood coatings, and generally exhibit good adhesion properties. Aqueous emulsions of unsaturated polyesters or polyester (meth)acrylates are predominantly used as radiation-curable coatings. After evaporation of the water, liquid to tacky films are formed and are cured by irradiation. In the case of highly structured, non-sheet-like substrates, for example profile strips or chairs, complete irradiation of the coated surfaces is often impossible owing to shadow formation. These shadow areas then remain tacky.

Radiation-curable dispersions which dry substantially without tack in the absence of irradiation are therefore desired for many applications. On the other hand, the radiation-curable dispersions should exhibit good leveling, ie. should be uniformly distributed on the surface to be coated, without leveling problems, and should have a low film-formation temperature.

EP-A-486 278 discloses radiation-curable dispersions which contain a non-radiation-curable emulsion polymer and radiation-curable (meth)acrylates.

With these dispersions, the abovementioned requirements for radiation-curable dispersions are not yet satisfactorily met.

It is an object of the present invention to provide radiation-curable dispersions which exhibit good leveling during coating of the surface and dry substantially without tack before irradiation.

We have found that this object is achieved by the aqueous dispersion defined above.

The novel, aqueous dispersion contains preferably 40-85% by weight of the dispersed polymer A) and preferably 15-60% by weight of the (meth)acrylates B). The stated weights are based on the sum of the dispersed polymer and of the (meth)acrylates.

The polymer comprises preferably at least 40, particularly preferably at least 60, very particularly preferably at least 80, % by weight of main monomers, such as $C_1$-$C_{20}$-alkyl (meth)acrylates, vinyl esters of carboxylic acids of 1 to 20 carbon atoms, vinylaromatics of up to 20 carbon atoms, ethylenically unsaturated nitriles of 3 to 6 carbon atoms, vinyl halides, aliphatic hydrocarbons having 4 to 8 carbon atoms and at least 2 conjugated double bonds and aliphatic hydrocarbons having 2-5 carbon atoms and one double bond, eg. ethylene, and mixtures of these monomers.

$C_1$-$C_8$-Alkyl (meth) acrylates, such as methyl (meth) acrylate, ethyl (meth) acrylate, n-propyl and isopropyl (meth) acrylate, n-butyl (meth) acrylate and 2-ethylhexyl (meth) acrylate, vinyl esters, such as vinyl acetate and vinyl propionate, styrene and α-methylstyrene as vinylaromatics, vinyl halides, such as vinyl chloride or vinylidene chloride, and butadiene and isoprene as diolefins are preferred.

Particularly preferred main monomers are $C_1$-$C_8$-alkyl (meth)acrylates and styrene as well as mixtures thereof.

Further monomers, which may be present in the polymer in an amount preferably of 0-40, particularly preferably 0-20, % by weight, are, for example, $C_1$-$C_{10}$-hydroxyalkyl (meth) acrylates, (meth) acrylic acid, (meth) acrylamide, glycidyl (meth)acrylate, maleic acid, fumaric acid and anhydrides thereof. (Meth)acrylic acid and glycidyl (meth)acrylate are particularly preferred.

The monomers of which the polymer is composed are chosen so that the polymer has a glass transition temperature above 30° C., preferably above 60° C.

The glass transition temperature of the copolymer can be determined by conventional methods, such as differential thermal, analysis or differential scanning calorimetry (cf. for example ASTM 3418/82, midpoint temperature).

The polymer can be prepared, for example, by solution polymerization or mass polymerization with subsequent dispersing in water or preferably by emulsion polymerization in water.

In the emulsion polymerization, the monomers can be polymerized in a conventional manner in the presence of a water-soluble initiator and of an emulsifier at, preferably, from 30° to 95° C.

Examples of suitable initiators are sodium persulfate, potassium persulfate, ammonium persulfate, tert-butyl hydroperoxide, water-soluble azo compounds and redox initiators.

Examples of emulsifiers used are alkali metal salts of relatively long-chain fatty acids, alkylsulfates, alkylsulfonates, alkylated arylsulfonates or alkylated diphenyl ether sulfonates. Other suitable emulsifiers are reaction products of alkylene oxides, in particular ethylene oxide or propylene oxide, with fatty alcohols, fatty acids or phenol or alkylphenols.

In the polymerization, regulators may be used for adjusting the molecular weight. For example, -SH-containing compounds, such as mercaptoethanol, mercaptopropanol, thiophenol, thioglycerol, thioglycolates, methyl thioglycolate and tert-dodecyl mercaptan, are suitable.

The novel dispersion contains tri-hexa (meth)-acrylates B) in addition to the polymers A).

The tri-hexa (meth) acrylates are obtainable by alkoxylation of trihydric to hexahydric alcohols, in particular alcohols of 3 to 20 carbon atoms, eg. trimethylolpropane, glycerol, di-trimethylolpropane, pentaerythritol, sorbitol or dipentaerythritol, with alkoxides, in particular ethylene oxide and propylene oxide, and subsequent esterification with an amount of (meth) acrylic acid which ensures that from 3 to 6 (meth)acryloyl groups are present in the molecule.

The preparation of the (meth)acrylates as such is known and is described in, for example, U.S. Pat. No. 3 380 831.

The degree of alkoxylation of the trihydric to hexahydric alcohol, defined as the total number of alkoxy groups present divided by the number of hydroxyl groups, ie. the functionality of the alcohol prior to the alkoxylation, is at least 0.5, preferably not more than 20, particularly preferably from 0.5 to 10, very particularly preferably from 0.7 to 2.

Preferred tri-hexa (meth) acrylates are those of the formula

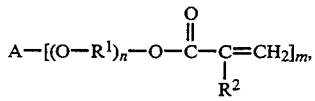

$$A-[(O-R^1)_n-O-\overset{O}{\underset{R^2}{\overset{\|}{C}}}-C=CH_2]_m, \quad I$$

where A is an organic radical of 3 to 20, preferably 3 to 10, carbon atoms, $R^1$ is $C_1$-$C_6$-alkylene, preferably $C_2$- or $C_3$-alkylene, $R^2$ is hydrogen or methyl, n is an integer from 0 to 10 and m is an integer from 3 to 6.

Some of the (meth)acryloyl groups in the (meth)acrylates B) may also be reacted with primary or secondary amines to give a Michael adduct, as also described in U.S. Pat. No. 39 14-165.

Examples of suitable primary or secondary amines which undergo addition at double bonds to give Michael adducts are heterocyclic compounds, such as piperazine, 1-ethylpiperazine, N-(aminoethyl)-imidazole, morpholine, N-(aminoethyl)-morpholine and primary or secondary amines which are substituted by aliphatic and/or aromatic groups. Aliphatic primary or secondary amines which are substituted by one or two $C_1$-$C_6$-alkyl groups or $C_1$-$C_6$-hydroxyalkyl groups are preferred. Primary or secondary amines which are substituted by one or two $C_1$-$C_4$-alkyl groups are particularly preferred. Dibutylamine and morpholine are very particularly preferred.

Preferably not more than 50, particularly preferably not more than 25, mol % of the double bonds of the (meth)acrylates are in the form of Michael adducts with primary or secondary amines.

The (meth)acrylates B) may be added to the aqueous dispersions obtained in the preparation of the polymers A) and may be mixed therewith by simple measures. In order to disperse the (meth)acrylates, protective colloids, for example polyvinylpyrrolidone, copolymers of vinyl propionate or acetate and vinylpyrrolidone, copolymers of (meth)acrylic acid, (meth)acrylates and (meth)acrylonitrile, polyvinyl alcohols having different residual acetate contents, cellulose ethers, gelatine or mixtures of these substances, may also be added. Particularly preferred protective colloids are polyvinyl alcohol having a residual acetate content of less than 35, in particular from 5 to 30, mol % and/or a vinylpyrrolidone/vinylpropionate copolymer having a vinyl ester content of less than 35, in particular from 5 to 30, % by weight.

The solids content of the novel dispersion can be adjusted to give the desired viscosity. In general, the solids content is from 20 to 80, in particular from 20 to 70, % by weight.

The novel dispersions are particularly suitable as coating materials and may contain further additives, for example pigments, dyes, fillers and assistants conventionally used in coating technology.

For radiation curing by UV light, in general photoinitiators are added to the dispersions.

Examples of suitable photoinitiators are benzophenone, alkylbenzophenones, halomethylated benzophenones, Michler's ketone, 2-hydroxyacetophenone and halogenated benzophenones. Benzoin and its derivatives are also suitable. Other effective photoinitiators are anthraquinone and many of its derivatives, for example, β-methylanthraquinone, tert-butylanthraquinone and anthraquinonecarboxylic esters and in particular acylphosphine oxides, eg. Lucirin ® TPO.

The photoinitiators, which, depending on the intended use of the novel materials, are used in amounts of from 0.1 to 15, preferably from 0.1 to 10, % by weight, based on the polymerizable components, can be used as an individual substance or, owing to the frequent advantageous synergistic effects, also in combination with one another.

Advantageous additives which may lead to a further increase in the reactivity are certain tertiary amines, eg. triethylamine and triethanolamine. They too may be used in amounts of up to 5% by weight, based on the polymerizable components.

Finally, it should also be mentioned that the novel dispersions can furthermore be thermally crosslinked. In this case, it is necessary to add initiators which form free radicals at elevated temperatures, for example, dibenzoyl peroxide, cumene hydroperoxide or azobisisobutyronitrile can be used. Further examples of suitable initiators are described in Polymer Handbook, 2nd Edition, Wiley & Sons, New York.

The novel dispersions can be used for the production of coatings.

They can be applied to substrates such as metal, plastic, glass, wood, paper, board, leather or textile, for example by spraying, pouring, roller coating, printing or knife coating.

In the case of radiation curing, the coatings are generally preheated for up to 30 minutes at up to 100° C. and then exposed for a short time to UV radiation or high-energy electron radiation. The UV or electron radiation sources usually employed for curing coatings are used for this purpose.

In the case of porous substrates, for example leather, paper or wood, only very short preheating times are required since the main amount of the water is absorbed by the substrate; in some cases, preheating can be completely dispensed with.

The dispersions exhibit good leveling and can therefore be applied uniformly to surfaces, without leveling problems. The surfaces are substantially nontacky even before curing with UV or electron radiation.

The coatings obtained after curing have good mechanical properties, in particular good elastic properties, and very good resistance to chemicals. The film-formation temperature of the novel dispersion is lower than that of conventional dispersions. Thus, energy or film-formation assistants can be saved and heat-sensitive substrates can be coated in a gentle manner. Furthermore, low molecular weight (meth)acrylates which have been used to date and often have an irritant effect on the skin are replaced by (meth)acrylates B) in the novel dispersions.

EXAMPLES

EXAMPLE 1

The aqueous dispersion used contained
A) 70% by weight of a polymer of 20% by weight of styrene, 32.5% by weight of n-butyl acrylate, 32.5% by weight of methyl methacrylate and 10% by weight of glycidyl methacrylate
and B) 30% by weight of trimethylolpropane triethoxytriacrylate acrylate (degree of alkoxylation 1)
(Stated weights based on A)+B))

The dispersion had a solids content of 50% by weight, a viscosity of 40 mPa.s (cone-and-plate viscometer, 23° C.) and a minimum film-formation temperature (DIN 53,787) of 44° C.

The dispersion was mixed with 4 % by weight, based on the solid, of Irgacure ® 500 (Ciba-Geigy) and stored for 12 hours before being processed. Films applied using a knife coater were dried in a drying oven at 60° C. for 20 minutes. The films were dry, clear and highly glossy and exhibited no leveling problems. The films were then exposed under a high pressure mercury lamp on a conveyor belt at a belt speed of 5 m/min; the appearance of the film did not change during this procedure. The chemical resistance and the mechanical properties improved. The films were nontacky at 60 C.

Properties of the coatings after UV exposure:

| | |
|---|---|
| Hardness based on pendulum damping (DIN 53,157) | 57 sec |
| Erichsen cupping (DIN 53,156) | >10 mm |
| Crosshatch test on steel sheet (DIN 53,151) | very good |
| Resistance to chemicals according to DIN 68,860 B | fulfilled |

EXAMPLE 2

The aqueous dispersion used contained
A) 70% by weight of a polymer of 20% by weight of styrene, 30% by weight of methyl methacrylate, 40% by weight of n-butyl acrylate and 10% by weight of glycidyl methacrylate
and
B) 30% by weight of trimethylolpropane propoxyethoxytriacrylate.

The dispersion had a solids content of 50% by weight and a viscosity of 35 mPa.s.

Example 1 gave films which were nontacky, clear and glossy even without irradiation.

Properties of the coatings after UV exposure:

| | |
|---|---|
| Hardness based on pendulum damping (DIN 53,157) | 59 sec |
| Erichsen cupping (DIN 53,156) | >10 mm |
| Crosshatch test on steel sheet (DIN 53,151) | very good |
| Resistance to chemicals according to DIN 68,860 B | fulfilled |

COMPARATIVE EXAMPLE 1

Comparative Example 1 corresponded to Example 1, except that trimethylolpropane triethoxytriacrylate was replaced by trimethylolpropane triacrylate.

The dispersion had a solids content of 49.7% by weight and a viscosity of 55 mPa.s. The minimum film-formation temperature was above 65° C.

The coatings obtained after UV exposure were brittle and contained tears, so that further properties of the coating film could not be tested.

COMPARATIVE EXAMPLE 2

Comparative Example 2 corresponded to Example 1, except that trimethylolpropane triethoxytriacrylate was replaced by tripropylene glycol diacrylate.

The dispersion had a solids content of 47.5% by weight and a viscosity of 45 mPa.s.

The unexposed films Were still tacky.

Properties of the coatings after UV exposure:

| | |
|---|---|
| Hardness based on pendulum damping (DIN 53,157) | 24 sec |
| Erichsen cupping (DIN 53,156) | >10 mm |
| Crosshatch test on bonder 26 (DIN 53,151) | very good |
| Resistance to chemicals according to DIN 68,860 B | fulfilled |

We claim:
1. An aqueous dispersion containing
   A) from 20 to 90% by weight of a dispersed polymer having a glass transition temperature above 30° C. and
   B) from 10 to 80% by weight of a tri-, tetra-, penta-or hexa(meth)acrylate of an alkoxylated, trivalent to hexavalent alcohol having a mean degree of alkoxylation of the hydroxyl groups of the alcohol, defined as the quotient of the number of alkoxy groups to the number of hydroxyl groups, ie. the functionality of the alcohol prior to the alkoxylation, of at least 0.5,
the stated weights being based on the sum of A) and B).

2. An aqueous dispersion as defined in claim 1, wherein the tri-hexa(meth)acrylates B) are those of the formula

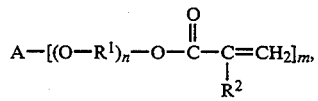

where A is an organic radical of 3 to 20 carbon atoms, $R^1$ is $C_1$-$C_6$-alkylene, $R^2$ is hydrogen or methyl, n is an integer from 0 to 20 and m is an integer from 3 to 6.

3. An aqueous dispersion as claimed in claim 1, wherein not more than 50 mol % of the double bonds in the (meth)acrylates B) form a Michael adduct with primary or secondary amines.

4. An aqueous dispersion as defined in claim 1, wherein the glass transition temperature of the polymers A) is above 60° C.

5. A process for coating surfaces, which comprises: applying a dispersion as defined in claim 1 to the surfaces and, after brief drying, the coating is cured by exposure to high-energy radiation.

6. A coated article obtained by using a dispersion as claimed in claim 1.

7. A process for coating surfaces which comprises: applying a dispersion as defined in claim 1 to the surfaces and drying the coated material to form a tack-free film.

* * * * *